Sept. 23, 1958　　　　　E. L. MENCH　　　　　2,853,144
FLOOR SUPPORTED BRACKET AND BRAKE LINKAGE
Filed May 27, 1953　　　　　　　　　　　　　2 Sheets-Sheet 1
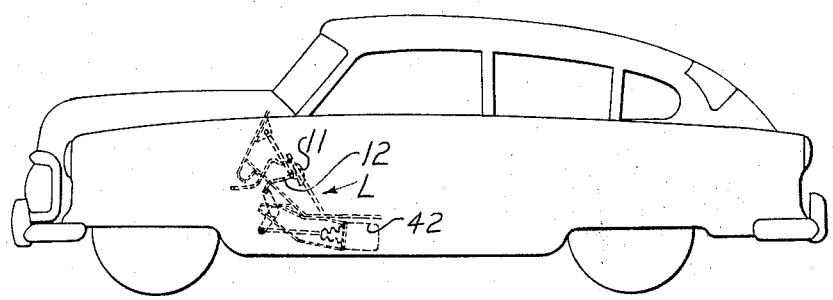
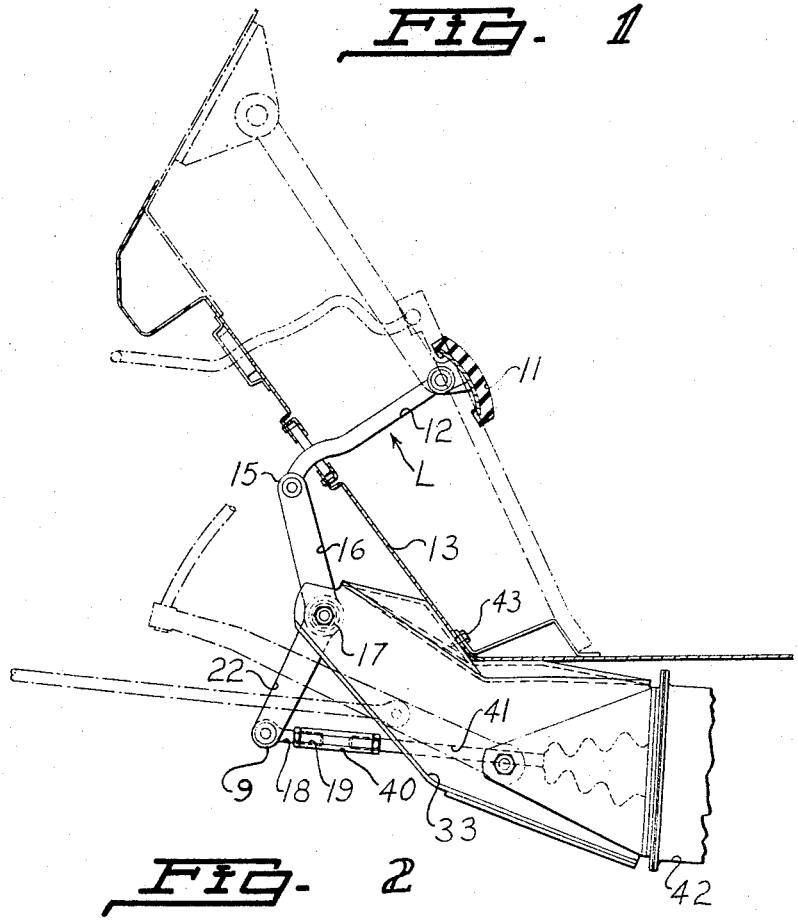
INVENTOR.
EUGENE L. MENCH
BY
*Carl J. Barbee*

Sept. 23, 1958            E. L. MENCH            2,853,144
FLOOR SUPPORTED BRACKET AND BRAKE LINKAGE
Filed May 27, 1953            2 Sheets-Sheet 2
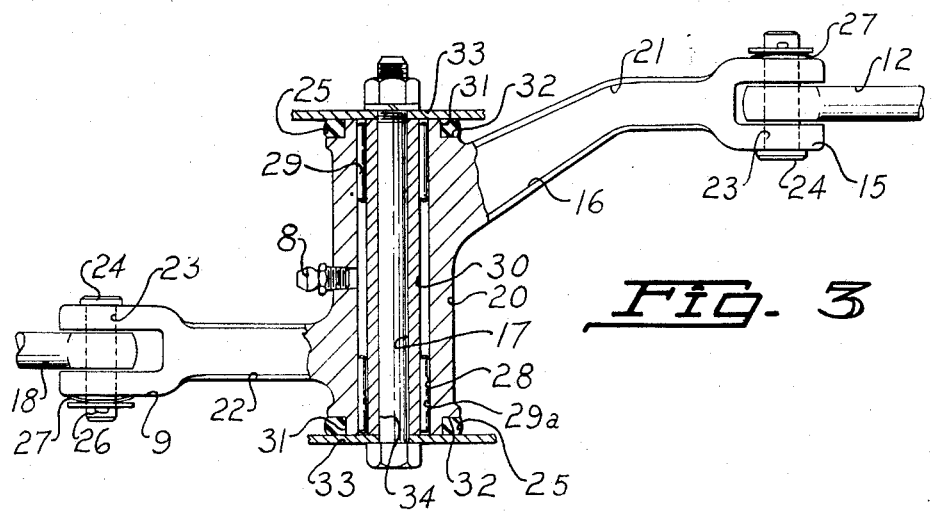
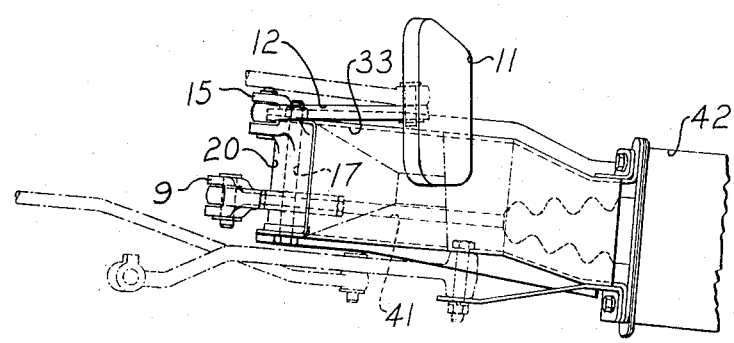
INVENTOR.
EUGENE L. MENCH
BY
Carl J. Barbee

United States Patent Office 2,853,144
Patented Sept. 23, 1958

2,853,144

FLOOR SUPPORTED BRACKET AND BRAKE LINKAGE

Eugene L. Mench, Kenosha, Wis., assignor to American Motors Corporation, a corporation of Maryland Application May 27, 1953, Serial No. 357,780

1 Claim. (Cl. 180—77)

This invention relates to a so-called power brake installation and more particularly to the linkage used in connection with a brake pedal and vacuum assembly for so-called power braking.

It is an object of this invention to provide a linkage to be used with a vacuum operated power brake which is particularly adaptable for use with unitized automobile body construction and is arranged to be used whether there is a standard or hydraulic transmission.

The application of power braking to automobiles not classified as of unitary body construction does not present any particular problems. In such type of body design, there is usually sufficient space whereby the actual vacuum assembly may be mounted adjacent the toe board of the automobile or at least within the so-called engine compartment. In automobiles of so-called unitary body design, the space comprising the engine compartment is usually of constricted area. This is caused by the peculiar shaping of the wheel housings and other associated structure. I contemplate, therefore, mounting the vacuum assembly below the floor pan of the automobile and arranging the linkage of the present invention between said vacuum assembly and the brake pedal.

A further object of this invention is to provide a power brake operating linkage which is simple in design, economical to manufacture and easy to install in such unitized automobile body.

I am aware of the various constructions heretofore used with respect to actuating power brakes. Under the circumstances it will be manifest that it is my chief aim to generally improve upon prior structures of the general type by providing an arrangement characterized by appreciable refinements and structural improvements.

The several objects, advantages and novel details of construction of the invention will be made more apparent as this description proceeds, especially when considered in connection with the accompanying drawings, wherein:

Figure 1 is a plan view of an automotive vehicle with a portion of the invented subject matter disclosed in dotted lines.

Figure 2 is a side view of the apparatus as shown in Figure 1.

Figure 3 is a plan view of the bell crank and portions of its associated structures.

Figure 4 is a plan view of the invention as shown in Figure 2.

Referring to Figures 1 and 2, the invention is shown as it may be used in association with certain designated parts of a motor vehicle, said invention and linkage designated by the letter L. The foot pedal 11, provided with a pedal rod 12, extends through a toe board 13 where the free end of the rod is rotatably mounted between the forked end 15 of a bell crank 16. This bell crank 16 is in turn rotatably mounted on a threaded pin or bolt member 17 at an intermediate point between the bell crank ends 15 and 9. The end 9 is also forked and mounts, therebetween, one end of a short rod 18 which is threaded on its free end 9.

Attention is directed to the peculiar shape of the bell crank 16. The crank has a cylindrically shaped intermediate member 20 which has oppositely outwardly extending supports 21 and 22 formed integrally with said cylinder 20. The support 21 includes the forked end 15 and the support 22 includes the forked end 9. The support 21 is arranged adjacent one end of said cylinder with the support 22 arranged adjacent the other end of said cylinder.

Each forked end 15 and 9 is provided with a pair of oppositely disposed apertures which are capable of receiving a pin 23 in each instance and which normally rotatably mounts the free end of pedal rod 12 between the forked end 15 and the free end of rod 18 between the forked end 9.

Each pin 23 is headed at one end, as indicated by the numeral 24 with its free end apertured to receive a cotter pin 26 for retaining the forked ends 15 and 17 engaged with said pedal rod 12 and said short rod 18.

A spring washer 27 is interposed between each cotter pin and the adjacent forked end to prevent any undue lateral movement of either pin 23.

The cylinder 20 is provided with a longitudinally extending bore 28 provided with spaced needle bearings 29 and 29a mounted adjacent each end of said cylinder. A tubular spacer 30 is directly associated with the needle bearings 29 and 29a and extends within and from each end of cylinder 20, terminating just short of the ends of said cylinder.

A circular recess 31 is formed at each end of said column 20 having an outside diameter somewhat smaller than the outside diameter of said cylinder 20 whereby a shoulder 32 of substantial proportions is obtained. A rubber washer 25 is mounted and encircles each recess 31 with the free face in each instance bearing up against the adjacent oppositely spaced sides of the legs of a Y-shaped bracket 33. The sides are provided with a similarly arranged aperture in each instance to receive a pin 34 which extends entirely through the spacer with the head of said pin bearing strongly against the outside surface of one of said bracket legs 33 with the free end of said pin threaded and threadedly engaged by a nut which is drawn up strongly against the outside surface of the other of said legs of bracket 33 only separated by a spring washer. With this arrangement, the cylinder is thereby held in position between said legs of bracket 33 but free to rotate around said pin. The needle bearings may be lubricated through a grease fitting 8 spaced in the cylinder.

An internally threaded sleeve 40, open at both ends, is threadedly engaged by the threaded end of said short rod. This sleeve also receives one threaded end of the treadle vacuum unit rod 41. A pair of locking nuts are provided, one each of which are arranged adjacent the ends of said sleeve 40 with each one being threaded upon the short rod and treadle rod, respectively. This sleeve, together with the nut represents an adjustment medium between the linkage and the treadle vacuum unit.

The Y-bracket is of substantial proportions and of very sturdy construction and in addition to supporting said bell crank 16, also provides space to support the vacuum unit 42 for power braking. The bracket is shaped to have one top portion secured adjacent the toe board by providing an enlarged aperture suitable to receive a fastening element 43 to mount said portion. The bracket is bent along its top surface with an additional trailing portion providing a comparatively wide surface having spaced apertures adaptable to receive other suitable fastening elements to secure the trailing portion of said bracket underneath the body of a vehicle.

It is believed that the construction, manipulation, utility, and advantages of this invention will now be apparent to those skilled in this art without a more detailed description thereof.

The present embodiment of the invention has been described in considerable detail merely for the purpose of exemplification since in actual practice it attains the features of the invention and the above description.

It will be apparent that changes in the details of construction, and in the combination and arrangements of parts may be resorted to without departing from the spirit and scope of the invention as hereinafter claimed or sacrificing any of its advantages.

Having described my invention, what I claim is:

For use with an automotive vehicle having a floor, a toe board merging with the floor but inclined upwardly relative thereto and a power cylinder situated beneath the floor, apparatus for actuating the power cylinder comprising: a supporting bracket anchored at the juncture of toe board and floor on the underside thereof and having its forward end overhanging the toe board and its rearward end overhanging the floor; a pin carried by the bracket at the forward end thereof; a bell crank pivotally carried on the pin; an actuating rod extending to the power cylinder and having pivotal connection to one end of the bell crank; a pedal carrying rod extending through the toe board and having one end pivotally connected to the end of the bell crank remote from the end to which the actuating rod is connected; said power cylinder being situated beneath the floor and being anchored to the bracket at the end thereof remote from the end at which the bell crank is carried.

References Cited in the file of this patent

UNITED STATES PATENTS

| | | |
|---|---|---|
| 501,902 | Spindler | July 18, 1893 |
| 1,489,711 | O'Neil | Apr. 8, 1924 |
| 2,168,719 | Staude | Aug. 8, 1939 |
| 2,242,145 | Rushfeldt | May 13, 1941 |
| 2,367,064 | Shoemaker et al. | Jan. 9, 1945 |
| 2,440,780 | Mott | May 4, 1948 |
| 2,534,435 | Ghurye | Dec. 19, 1950 |
| 2,547,593 | Morris | Apr. 3, 1951 |